United States Patent [19]

Hwang

[11] Patent Number: 5,342,483

[45] Date of Patent: Aug. 30, 1994

[54] PROCESS FOR DEINKING PAPER USING WATER-SOLUBLE ALCOHOLS

[75] Inventor: Jiann-Yang Hwang, Houghton, Mich.

[73] Assignee: Magnetic Separation Engineering, Inc., Indianapolis, Ind.

[21] Appl. No.: 988,718

[22] Filed: Dec. 10, 1992

[51] Int. Cl.$^5$ .................................. D21C 5/02
[52] U.S. Cl. ........................... 162/5; 162/55; 162/77
[58] Field of Search ............ 162/4, 5, 55, 41, 60, 162/189, 77

[56] References Cited

U.S. PATENT DOCUMENTS

| | | | |
|---|---|---|---|
| 2,077,059 | 4/1937 | Snyder et al. | 92/20 |
| 2,112,562 | 3/1938 | Fisher | 92/9 |
| 2,582,496 | 1/1952 | Massey et al. | 92/1.5 |
| 3,072,521 | 1/1963 | Samuelson et al. | 162/5 |
| 3,501,373 | 3/1970 | Illingworth | 162/5 |
| 3,557,956 | 1/1971 | Braun | 210/84 |
| 3,635,789 | 1/1972 | Green, Jr. | 162/5 |
| 3,846,227 | 11/1974 | Mestetsky et al. | 162/5 |
| 4,076,578 | 2/1978 | Puddington et al. | 162/5 |
| 4,360,439 | 11/1982 | Calmanti et al. | 162/5 |
| 4,487,655 | 12/1984 | Noetzel et al. | 162/5 |
| 4,518,459 | 5/1985 | Freis et al. | 162/5 |
| 4,666,558 | 5/1987 | Wood et al. | 162/5 |
| 4,971,656 | 11/1990 | Lehmann et al. | 162/5 |
| 5,061,370 | 10/1991 | Ferland et al. | 210/194 |

FOREIGN PATENT DOCUMENTS

| | | |
|---|---|---|
| 174825 | 9/1984 | European Pat. Off. . |
| 3182487 | 1/1987 | Japan . |
| 3287889 | 3/1990 | Japan . |
| 926130 | 5/1976 | U.S.S.R. . |

*Primary Examiner*—Peter Chin
*Assistant Examiner*—Dean T. Nguyen
*Attorney, Agent, or Firm*—Woodard, Emhardt, Naughton, Moriarty & McNett

[57] ABSTRACT

A process for deinking wastepaper by combining a water-miscible organic solvent with inked paper to create a solvent/paper slurry, agitating the solvent/paper slurry to assist in releasing ink from the paper, separating the ink-ladden solvent from the paper, and washing residual ink and solvent from the paper.

11 Claims, 1 Drawing Sheet

PROCESS FOR DEINKING PAPER USING WATER-SOLUBLE ALCOHOLS

FIELD OF THE INVENTION

The present invention relates generally to paper deinking, and more particularly to a process for deinking paper using water-soluble organic solvents.

BACKGROUND TO THE INVENTION

The world paper industry operates in a competitive market in which both quality and cost are of vital concern. Because of the increasing cost of virgin paper fibers, papermakers are increasingly depending on recycled fiber to help satisfy their paper resource needs. This recycled paper must be of high quality however in order to effectively compete with virgin fibers.

Recycled paper must generally be deinked before being reused. As the name suggests, deinking is the art of removing various inks from printed or typed papers. These printing inks are commonly a mixture of pigment, varnish, metallic driers, additives (such as wax, flow agents and plasticizers), polymeric binders and solvents.

The composition of printing inks varies, of course, depending on its use. For example, carbon black, rosin and mineral oil are the main ingredients of news and magazine inks, while dyes, binders and volatile solvents are included in significant amounts to make flexographic inks, etc. Each type of ink presents unique problems for deinking technicians.

Generally, ink is printed onto paper as a film, the thickness of which varies according to the use. Since the ink film is a polymer formed either by drying or by polymerization of the ink, separation of the ink from the printed paper is a difficult and time-consuming process.

In the deinking technologies of the prior art, separation of ink from printed papers is generally accomplished in a pulper in aqueous solution. In such prior art processes, sodium hydroxide, sodium silicate and hydrogen peroxide are the major deinking chemicals used. This aqueous deinking process involves wetting the paper to soften both the paper and ink binders. Sodium hydroxide is used to provide an alkaline environment in which papers can be quickly wetted and swelled by alkali. Sodium silicate acts as a dispersant, pH buffer, and stabilizer of hydrogen peroxide. Hydrogen peroxide is used to improve the brightness of the deinked fibers. The combined chemical and mechanical forces act to separate the ink from the fibers. Additionally, any sizing, pigments, dyes, inorganic fillers and coatings in the system are dispersed into the solution and removed.

Methods of removing ink from wastepapers depend, at least in part, on the size of the ink particles. If the particle size is small, a wash deinking process may be used. When larger particles are present, flotation deinking methods are applied. In certain applications combinations of both processes are used.

In wash deinking processes, ink in the paper slurry is washed out by water. Disadvantages such as yellowing of the finished papers due to the presence of the residual alkali, large consumption of water, presence of both ink and chemicals in the effluent, sensitivity to ink particle size, and low quality of recycled fibers are typically associated with these processes. As a result, only about one-fourth of all deinking mills use this method.

In flotation deinking systems, collectors such as fatty acids, calcium soaps and synthetic polymers are utilized to make nonfibrous particles hydrophobic. These collectors are adsorbed to the ink particles, where they attach to air bubbles in a flotation cell and are removed by floatation from the fiber slurry. Although flotation deinking systems do not typically exhibit the problems associated with wash deinking process, such systems are limited to certain types of ink. For example, xerographic, laser printed paper, and UV cured inks can benefit from this process, but water-based, flexographic inks are preferably not deinked in this manner. Further, flotation deinking typically results in the loss of between about 10% and 15% of the paper fibers.

A need therefore exists for an improved method of deinking wastepaper which is both economical and environmentally responsible. The present invention addresses that need.

SUMMARY OF THE INVENTION

A process for deinking wastepaper by dissolving the ink in a water-miscible organic solvent and removing the solvent from the paper. The inked paper is initially combined with the solvent to create a solvent/paper slurry. The solvent/paper slurry is agitated to assist in releasing the ink from the paper. Finally, the ink-ladden solvent is rinsed from the paper, and residual ink and excess solvent are washed away. In one preferred embodiment the solvent is conveniently recovered and reused in subsequent deinkings.

One objective of the present invention is to reduce the cost, enhance the fiber quality and eliminate the environmental problems associated with wastepaper deinking.

Related objects and advantages of the present invention will be apparent from the following description.

DESCRIPTION OF THE PREFERRED EMBODIMENT

Figure 1:
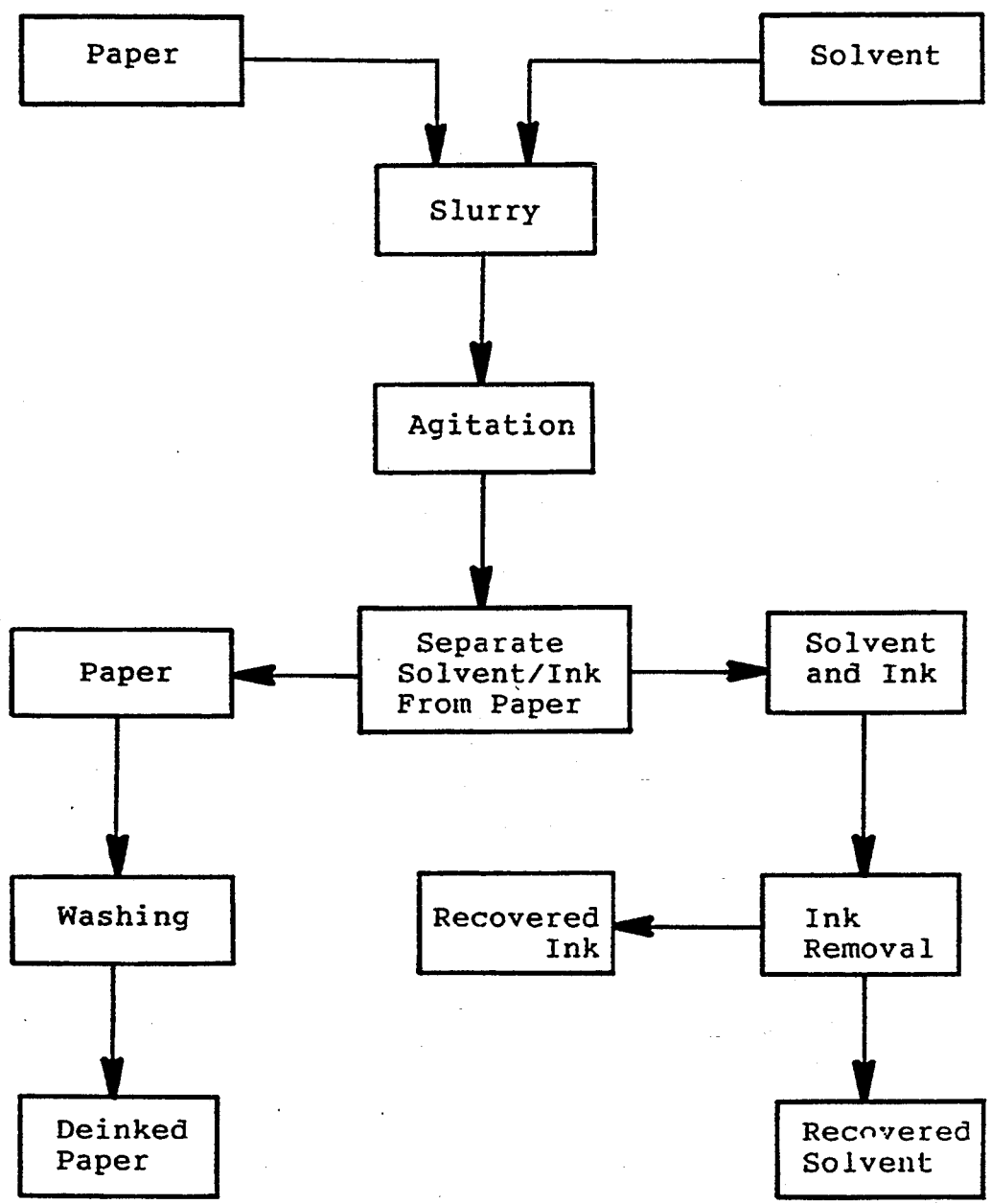
FIG. 1 is a flowchart of the process of the present invention according to one preferred embodiment.

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated embodiments, and such further applications of the principles of the invention as illustrated herein being contemplated as would normally occur to one skilled in the art to which the invention pertains.

The present invention relates to a method of deinking wastepaper by dissolving the ink in a water-miscible organic solvent and removing the ink and solvent from the fibers by a combination of chemical and mechanical means. No conventional deinking chemicals such as sodium hydroxide, sodium silicate, or hydrogen peroxide are used. Instead, water-soluble organic solvents are used as multifunctional deinking reagents.

The deinking is preferably accomplished according to the process shown by the flow chart of FIG. 1. Paper and a water-miscible organic solvent are mixed to form a slurry, and are agitated to assist in releasing ink from the paper. The solvent/ink solution is initially separated from the paper by mechanical means, and the solvent is recovered and separated from the ink. The partially deinked paper is washed one or more times to remove residual ink and ink/solvent solution, these washings preferably being accomplished with recovered solvent. One or more final washings with water is performed to remove the solvent and provide deinked paper of exceptional quality.

All fibrous paper products are contemplated for deinking according to the present invention. Examples of such products include newspapers, magazines, computer paper, xerographic paper, laser printed paper, brochures, catalogs, envelopes, etc. As is known in the art, the wastepaper may be sorted by type before being deinked.

Although not necessary for effective deinking, the paper is preferably cut into smaller pieces before agitation. Preferred pieces range in size from whole paper to small 1 mm×1 mm squares. Pieces preferred for low agitation deinking are typically strips about ⅛ inch to 2 inches wide.

The solvents of the present invention are water-miscible organic solvents capable of dissolving ink. The solvents must be capable of dissolving ink so that the ink may be dissolved in the solvent and removed from the paper. The solvent must be water soluble or miscible to facilitate water washing of the solvent from the deinked paper.

Preferred deinking solvents include water-soluble alcohols, ketones, ethers, esters, aldehydes, organic acids and the like, and mixtures thereof. In one aspect of the invention it is preferred to use water-soluble alcohol solvents such as methanol, ethanol, isopropanol and 1-butanol. In a further aspect of the invention it is preferred to use a water-soluble ketone such as acetone, methyl ethyl ketone or methyl isobutyl ketone. In another aspect of the invention it is preferred to use water-soluble ether solvents such as ethyl ether and dioxane. In a further aspect of the invention it is preferred to use water-soluble esters such as methyl acetate and ethyl acetate. In another aspect of the invention it is preferred to use water-soluble aldehydes such as formaldehyde or acetaldehyde. In another aspect of the invention it is preferred to use water-soluble organic acids such as acetic acid. In another aspect of the invention it is preferred to use water-soluble diols or triols such as ethylene glycol, propylene glycol or glycerol. Mixtures of these and other solvents may be used, as may mixtures of such solvents and water.

In addition to physical characteristics such as water solubility, ability to dissolve ink polymers, etc., cost is a significant factor in selecting a solvent. Accordingly, methanol, ethanol, propanol, acetone, and methyl ethyl ketone are particularly preferred due to their low cost, low boiling point and good water solubility. In addition, these solvents dissolve contaminants such as lignin and resin, and thereby improve the brightness and strength of the resulting paper fibers.

Mechanical agitation is preferably used to assist in releasing the ink from the paper. The mechanical agitation is preferably accomplished in two stages. The first stage employs low speed agitation to release the ink—thereby minimizing ink reabsorption and fiber damaging. At this stage, most of the ink, rosin and adhesives are dispersed or dissolved into the solvent. The second stage employs high speed agitation to remove residual nonfibrous materials and defiberize the paper. Alternatively, a single stage agitation step may be employed in the deinking process of the present invention.

Solvent containing ink in solution is initially separated from the paper fibers by physical separation. For example, screening is a common separation method which can be used to separate the ink and other nonfibrous materials from the paper fiber. This operation preferably includes coarse screening after the first-stage deinking and fine screening following the second-stage deinking. Selection of screen mesh sizes will depend on the range of sizes of deinked paper and may be accomplished by one skilled in the art without undue experimentation.

It is preferred that the paper be washed subsequent to removing the bulk of the ink with the solvent. This washing not only removes residual ink from the screened paper, it also removes excess solvent from the product. Washing is therefore preferably carried out in two or more steps. In the first step, a washing fluid is added to the screened papers or fibers to dilute the remaining solvent and assist in removing remaining ink. The first washing fluid can be the solvent, water, or their mixture. In the second step, the deinked paper is washed with water to remove the washing fluid. Because the solvent is water miscible, this final water washing is particularly effective. Each of these two steps may be repeated as necessary to achieve a desired quality in the finished product.

The washing/dilution steps are preferably carried out in a tank equipped with an agitator. Screen filtering can be again applied to assist in the removal of washing fluid. Vacuum filtering, pressure filtering, squeezing (pressing), drying, and other solid/liquid separation methods, can also be applied to improve the recovery of washing fluid.

Solvent and ink are both preferably recovered after physical treatment to separate the ink from solvent. As was noted above, tile solvent is preferably recovered for use in subsequent deinkings, while the ink is recovered and reused in future applications. Appropriate physical separation techniques include centrifugation, filtration, precipitation, distillation, and their combination.

Flocculants may also be added to improve the physical separation process. Various cationic, anionic and nonionic flocculants for water treatment may be advantageously used. Examples of such flocculants include polyamines, polyacrylamide-acrylates and polyacrylamides.

It is to be appreciated that adverse environmental effects are minimized by the process of the present invention. All solvents used in the disclosed process are recovered and recycled as described above. Additionally, the deinking of wastepaper provides substantial environmental advantages relative to the use of virgin papers.

It is also to be appreciated that the process of the present invention is simple relative to conventional deinking processes and may be economically practiced. Also, fibers deinked according to the present invention are of superior quality and can be used to make paper containing 100% recycled fibers.

Reference will now be made to specific examples using the processes described above. It is to be understood that the examples are provided to more completely describe preferred embodiments, and that no limitation to the scope of the invention is intended thereby.

EXAMPLE 1

Fifteen grams (oven dry basis) of newspaper scraps (1 inch square) were added to 500 ml 95% ethanol to provide a 3% consistency, and the slurry was agitated in a blender at low speed for 5 minutes at room temperature. The paper slurry was then filtered on a 30 mesh screen. The paper was handsqueezed and transferred back to the blender. After transfer, the papers were diluted to a 3% consistency with fresh 95% ethanol, followed by a second filtering on 30 mesh screen. After this treatment the papers were diluted to a 3% consistency, and beaten at high speed for 1 minute. The defiberized fibers were then filtered on a 65 mesh screen. This process was repeated 3 times. The deinked fibers have superior brightness, tensile strength and burst and tear indices than the original newspaper fibers (Table 1).

Similar results were obtained using methanol as the deinking solvent, as shown below.

TABLE 1

Paper Properties of the Recycled Fibers (determined by TAPPI Standards)

| Solvent | Strength Properties | | | | |
|---|---|---|---|---|---|
| | Tensile Strength (kNm/kg) | Brightness (%) | Tear Index (kNm$^2$/kg) | Burst Index (kPam$^2$/g) | Density (g/cm$^3$) |
| Water | 17.92 | 45.45 | 5.17 | 0.935 | — |
| Methanol | 29.04 | 56.28 | 6.167 | 1.636 | 0.502 |
| Ethanol | 30.25 | 55.15 | 5.646 | 1.755 | 0.510 |

EXAMPLE 2

Old newspapers (three percent) were deinked in acetone following the same procedure as described in Example 1. The deinked fibers were examined under a light microscope. No ink particles were found on the fibers.

Comparable results were obtained by replacing acetone with an 80% ethanol/20% water mixture.

EXAMPLE 3

A three percent consistency of computer paper scraps in 95% ethanol was kept in a blender. After 10 minutes of low speed agitation (speed 1) at room temperature the paper slurry was filtered and washed twice on a 35 mesh screen at a 3% consistency. After this treatment, the papers were defiberized and washed according to the same procedures as in Example 1. No ink particles were found on the deinked fibers when examined under a light microscope.

EXAMPLE 4

Color catalog scraps (1 inch square) were added to ethanol to a 3% consistency. After 5 minutes of low speed (speed 1) agitation in a blender at room temperature the paper slurry was filtered on a 35 mesh screen. The papers were handsqueezed and transferred into the blender where the initial treatment was repeated. After this treatment, the "deinked" fibers were diluted to a 3% consistency and beaten at high speed (speed 5) for 1 minute at room temperature in a blender. The beaten papers were filtered on a 65 mesh screen and were then transferred into a blender for retreatment two additional times. The deinked fibers were found to be free of ink when examined under a light microscope.

EXAMPLE 5

Xerographic paper scraps and acetone (technical grade) were provided at a 3% consistency in a blender. The stocks were first agitated at low speed for 10 minutes followed by filtration on 35 mesh screen. The deinked paper stocks were then washed twice with acetone. After washing, the stocks were transferred to the blender and diluted to a 3% consistency with acetone. The defiberization and further deinking of the fibers were accomplished by agitating the stocks at high speed for 5 minutes. The fibers were filtered and washed with acetone until colorless. No ink was observed on the deinked xerographic fibers when examined under a light microscope. Similar results were obtained for the laser printed papers when treated in the same manner.

EXAMPLE 6

Three percent of the xerographic paper scraps were added to a 50:50 mixture (v:v) of 95% ethanol and acetone. The paper stocks were then agitated in a blender at low speed for 10 minutes followed by 5 minutes of high speed beating. The fiber slurry was diluted and filtered, and the deinked fibers were collected as the filtrate. Under a light microscope, only a few small ink particles were found in the deinked fibers. Similar results were obtained for the laser printed papers when treated in the same manner.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A process for deinking wastepaper, comprising the steps of:
   (a) combining a water-miscible organic solvent selected from the group consisting of methanol, ethanol, isopropanol and 1-butanol with paper having ink thereon to create a solvent/paper slurry;
   (b) agitating the solvent/paper slurry to assist in releasing ink from the paper;
   (c) separating the solvent, with ink dissolved therein, from the paper; and
   (d) repeating steps (a) through (c) until the desired amount of ink has been removed from the paper.

2. A process according to claim 1, and further including the step of washing residual solvent from the deinked paper.

3. A process according to claim 2 wherein said washing step is accomplished in two stages, including a first washing step and a second washing step.

4. A process according to claim 3 wherein said first washing step includes washing with a water-miscible organic solvent.

5. A process according to claim 3 wherein said second washing step includes washing with water.

6. A process according to claim 5 wherein said second washing step removes essentially all of the water-miscible organic solvent.

7. A process according to claim 1 and further including the steps of:
   (f) recovering the solvent having ink dissolved therein; and
   (g) separating the ink from the recovered solvent.

8. A process according to claim 1 and further including the step of shredding the wastepaper before deinking.

9. A process according to claim 1 wherein said agitating step is accomplished in two stages, including a first agitating step and a second agitating step.

10. A process according to claim 9 wherein said second agitating step is at a higher speed than said first agitating step.

11. A process according to claim 1 wherein said separating step is accomplished in two stages, including a first separating step and a second separating step.

* * * * *